(12) United States Patent
Yang et al.

(10) Patent No.: US 8,358,518 B2
(45) Date of Patent: Jan. 22, 2013

(54) SWITCHING REGULATOR HAVING TERMINAL FOR FEEDBACK SIGNAL INPUTTING AND PEAK SWITCHING CURRENT PROGRAMMING

(75) Inventors: Ta-Yung Yang, Milpitas, CA (US); Shao-Chun Huang, Taipei County (TW); Chen-Hui Chan, Taipei (TW); Jenn-Yu G. Lin, Taipei County (TW)

(73) Assignee: System General Corporation, Sindian, Taipei County (TW)

( * ) Notice: Subject to any disclaimer, the term of this patent is extended or adjusted under 35 U.S.C. 154(b) by 373 days.

(21) Appl. No.: 12/748,548

(22) Filed: Mar. 29, 2010

(65) Prior Publication Data

US 2011/0038183 A1 Feb. 17, 2011

Related U.S. Application Data

(60) Provisional application No. 61/274,297, filed on Aug. 14, 2009.

(51) Int. Cl.
*H02M 3/335* (2006.01)

(52) U.S. Cl. .................. 363/21.13; 363/21.15; 363/56.1

(58) Field of Classification Search ............... 363/21.13, 363/21.15, 21.17, 131, 56.1
See application file for complete search history.

(56) References Cited

U.S. PATENT DOCUMENTS

| | | | | |
|---|---|---|---|---|
| 5,297,014 | A * | 3/1994 | Saito et al. ................. | 363/21.17 |
| 7,016,204 | B2 * | 3/2006 | Yang et al. ................. | 363/21.13 |
| 7,522,431 | B2 * | 4/2009 | Huynh et al. ............... | 363/21.12 |

* cited by examiner

*Primary Examiner* — Shawn Riley
(74) *Attorney, Agent, or Firm* — McClure, Qualey & Rodack, LLP

(57) ABSTRACT

A switching regulator of a power converter is provided and includes a feedback-input circuit, a programming circuit, and a peak-current-threshold circuit. The feedback-input circuit is coupled to a terminal of the switching regulator for receiving a feedback signal. The feedback-input circuit is operated in a first range of a terminal signal. The programming circuit is coupled to the terminal for generating a programming signal. The programming signal is operated in a second range of the feedback signal. The peak-current-threshold circuit generates a threshold signal in accordance with the programming signal. The feedback signal is coupled to regulate the output of the power converter, and the threshold signal is coupled to limit a peak switching current of the power converter.

8 Claims, 5 Drawing Sheets

SWITCHING REGULATOR HAVING TERMINAL FOR FEEDBACK SIGNAL INPUTTING AND PEAK SWITCHING CURRENT PROGRAMMING

CROSS REFERENCE TO RELATED APPLICATIONS

The present application claims the benefit of U.S. provisional application entitled "A switching regulator having a terminal for feedback signal input and peak switching current programming", Ser. No. 61/274,297, filed Aug. 14, 2009.

BACKGROUND OF THE INVENTION

1. Field of the Invention

The present invention is developed to minimize the pin counts of the switching regulator or the switching controller of power converters 2. Description of the Related Art Power converters are generally used to power many of electronic devices. The pulse-width modulation (PWM) technique is a conventional technology used in a power converter to control and regulate the output power. Various functions, including protection functions, are built-in in the integrated circuit of power converter to protect the power converter from permanent damage and for specific purpose.

To provide the additional functions to the power supply controller, additional pins are added for each function to the integrated circuit power supply controllers. Consequently, each additional function generally translates into an additional pin on the power supply controller chip, which results in increased costs and additional external components. Another consequence of providing additional functionality to power supply controllers is that there is sometimes a substantial increase in power consumption by providing the additional functionality.

BRIEF SUMMARY OF THE INVENTION

An exemplary embodiment of a switching regulator of a power converter comprises a feedback-input circuit, a programming circuit, and a peak-current-threshold circuit. The feedback-input circuit is coupled to a terminal of the switching regulator for receiving a feedback signal. The feedback-input circuit which is operated in a first range of a terminal signal. The programming circuit is coupled to the terminal for generating a programming signal. The programming signal is operated in a second range of the feedback signal. The peak-current-threshold circuit generates a threshold signal in accordance with the programming signal. The feedback signal is coupled to regulate the output of the power converter, and the threshold signal is coupled to limit a peak switching current of the power converter.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
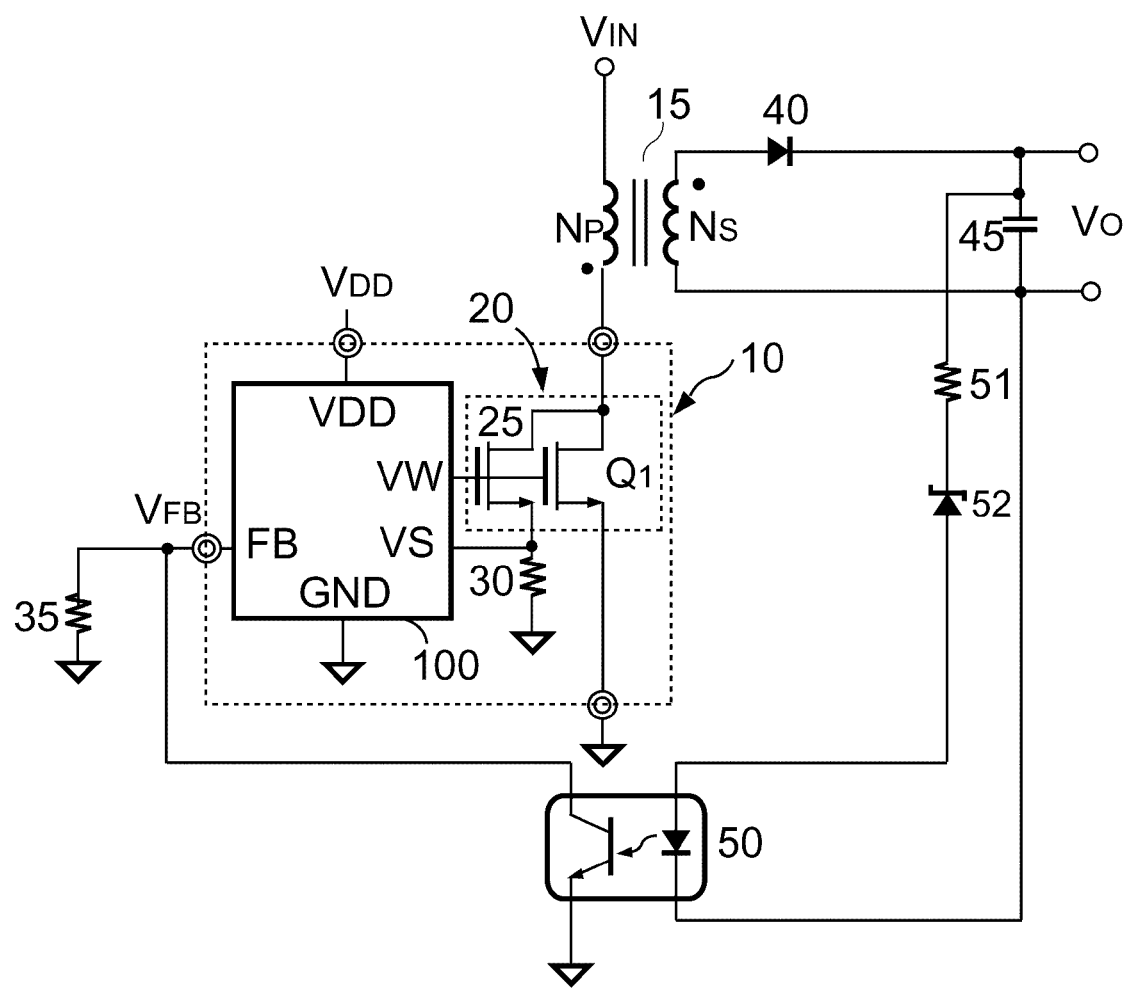
FIG. 1 shows an exemplary embodiment of a power converter.

FIG. 1 shows an exemplary embodiment of a power converter according to the present invention. A switching regulator 10 includes a controller 100 generating a drive signal $V_W$ to control a power device 20. The controller 100 is powered by a supply voltage $V_{DD}$. The power device 20 is a sense MOSFET Q1 having a mirror device 25 for generating a switching current signal $V_S$ at a resistor 30. The power device 20 is coupled to switch a transformer 15 which receives an input voltage $V_{IN}$. The value of the switching current signal $V_S$ is correlated to the value of the switching current of the transformer 15. A rectifier 40 and an output capacitor 45 are coupled to the output of the transformer 15 for producing an output $V_O$. A resistor 51, a shut regulator 52 (or a zener diode), and a optical coupler 50 form a feedback circuit for generating a feedback signal $V_{FB}$ coupled to an input terminal FB of the controller 100 of the switching regulator 10. The feedback signal $V_{FB}$ is used for regulating the output $V_O$ of the power converter. A resistor 35 is further coupled to the input terminal FB for programming a threshold signal $I_{PK}$ which will be shown in FIG. 2 and will be described in the following. The threshold signal $I_{PK}$ is coupled to limit the peak switching current of the power converter.

Figure 2:
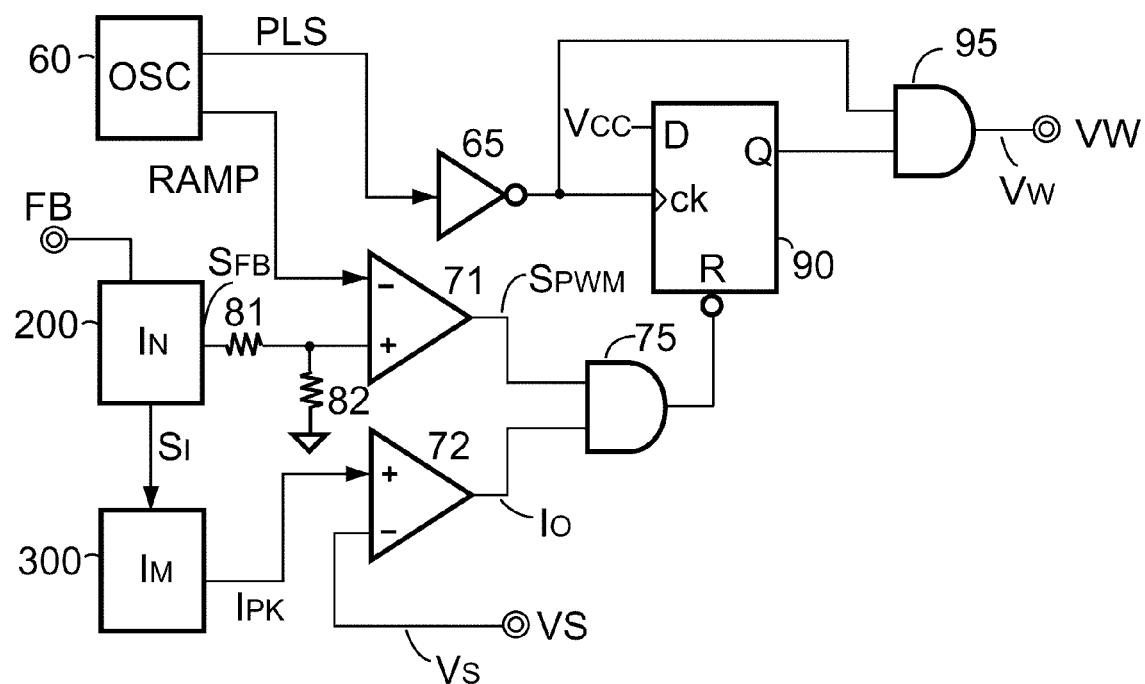
FIG. 2 shows an exemplary embodiment of the controller in FIG. 1.

FIG. 2 shows an exemplary embodiment of the controller 100 according to the present invention. An oscillator (OSC) 60 generates a pulse signal PLS to turn on the flip-flop 90 through an inventor 65. The flip-flop 90 generates the drive signal $V_W$ through an AND gate 95. The drive signal $V_W$ and the flip-flop 90 are turned off by a PWM signal $S_{PWM}$ and an over-current signal $I_O$. A comparator 71 generates the PWM signal $S_{PWM}$ as an output, and a comparator 72 generates the over-current signal $I_O$ as an output. The outputs of the comparators 71 and 72 are coupled to reset the flip-flop 90 via an AND gate 75. An input circuit (IN) 200 is coupled to the input terminal FB to generate a level-shift feedback signal $S_{FB}$, a differential signal $S_I$ and an open-loop signal $S_N$. The level-shift feedback signal $S_{FB}$ is correlated to the feedback signal $V_{FB}$. The level-shift feedback signal $S_{FB}$ is coupled to the comparator 71 through resistors 81 and 82. The oscillator 60 further generates a ramp signal RAMP coupled to be compared with the level-shift feedback signal $S_{FB}$ by the comparator 71 for generating the PWM signal $S_{PWM}$. The differential signal $S_I$ is coupled to a peak-current-threshold circuit ($I_M$) 300, and the peak-current-threshold circuit 300 generates the threshold signal $I_{PK}$ according to the differential signal $S_I$. The threshold signal $I_{PK}$ is coupled to the comparator 72 to be compared with the switching current signal $V_S$ for generating the over-current signal $I_O$.

Figure 3:
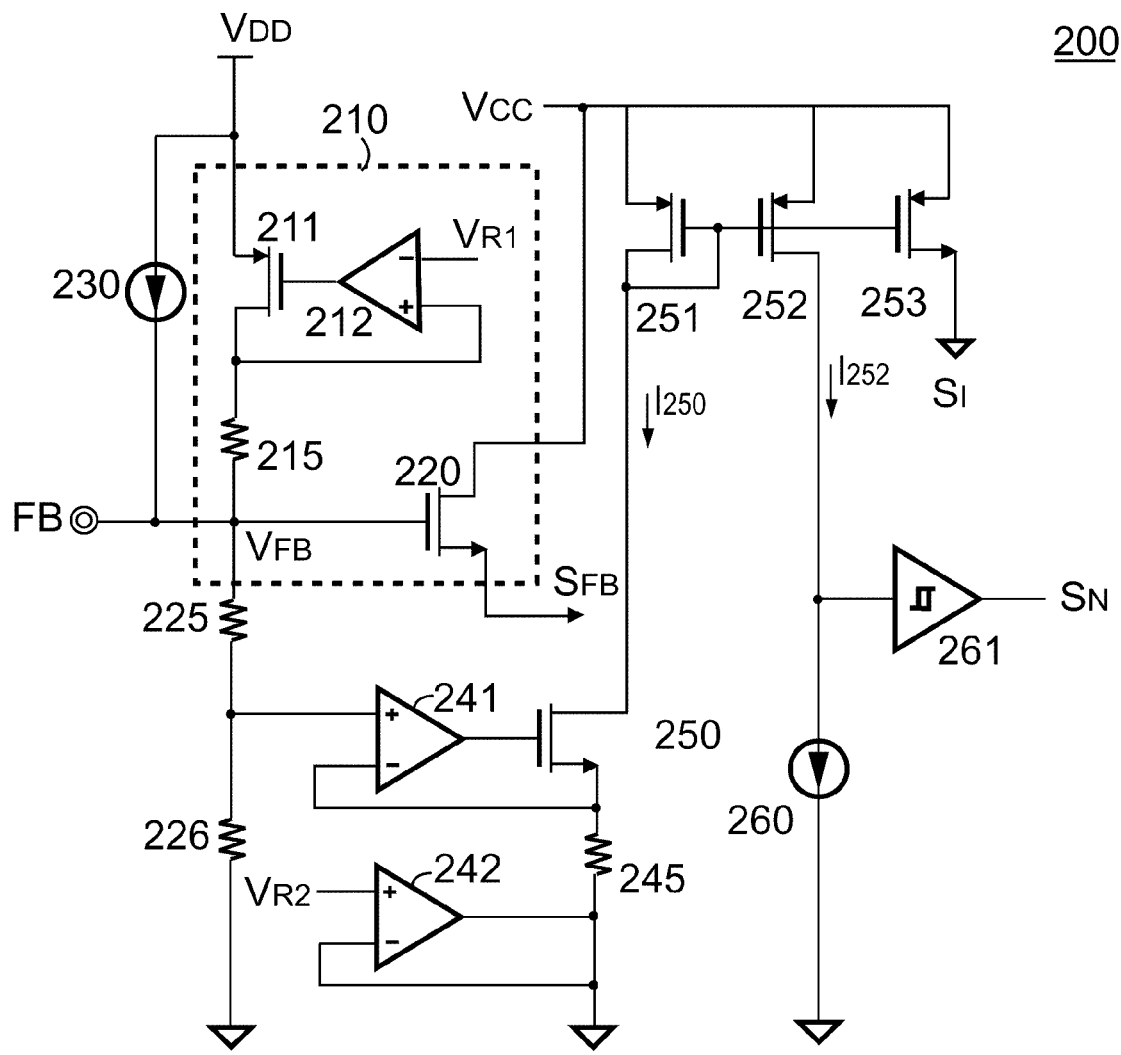
FIG. 3 shows an exemplary embodiment of the input circuit in FIG. 2.

FIG. 3 shows an exemplary embodiment of the input circuit 200 according to the present invention. The input circuit 200 includes a feedback-input circuit 210 and a programming circuit. An operational amplifier 212, a resistor 215, and transistors 211 and 220 form the feedback-input circuit 210. The programming circuit is developed by current sources 230 and 260, resistive devices 225 and 226, a resistor 245, a buffer 261, operational amplifiers 241 and 242, and transistors 250, 251, 252, and 253. The resistive devices 225 and 226 form a divider.

The feedback-input circuit 210 is coupled to the input terminal FB for receiving the feedback signal $V_{FB}$. The feedback signal $V_{FB}$ which is operated in a first range serves as a terminal signal. A clamp signal $V_{R1}$ is coupled to the operational amplifier 212 to limit the maximum value of the first range of the terminal signal. The operational amplifier 212 and the transistor 211 form a close loop regulator to provide a clamped voltage (the clamp signal $V_{R1}$) at the output terminal of the transistor 211. The output terminal of the transistor 211 is connected to the resistor 215. The resistor 215 provides a pull-high voltage for the feedback signal $V_{FB}$ (the output of the optical coupler 50) when the level of the feedback signal $V_{FB}$ is lower than the clamp signal $V_{R1}$, and the transistor 211 is turned on. Once the feedback signal $V_{FB}$ is higher than the clamp signal $V_{R1}$, the transistor 211 will be turned off, and the signal path of the resistor 215 will be switched off as well. At this time, a constant voltage of the feedback signal $V_{FB}$ is determined by the current source 230 associates with the external resistor 35. Therefore, the maximum value of the feedback signal $V_{FB}$ is limited by the clamp signal $V_{R1}$. The transistor 220 is controlled by the feedback signal $V_{FB}$ and receives a voltage source $V_{CC}$. The transistor 220 generates the level-shift feedback signal $S_{FB}$.

The programming circuit is also coupled to the input terminal FB for receiving the feedback signal $V_{FB}$ and generating a programming signal. The programming signal is the feedback signal $V_{FB}$ which is operated in a second range. In other words, the feedback signal $V_{FB}$ which is operated in the second range serves as the programming signal. The first range of the terminal signal and the second range of the programming signal are the voltage signals. The first range of the terminal signal is lower than the clamp signal $V_{R1}$. The second range of the terminal signal is higher than the clamp signal $V_{R1}$. The external resistor 35 is coupled to determine the programming signal. In detail, the current source 230 associates with the external resistor 35 to produce the programming signal for determining the threshold signal $I_{PK}$ (shown in FIG. 4 and FIG. 6). The programming signal is coupled to the input of the operational amplifier 241 through the divider composed by the resistive devices 225 and 226. A reference signal $V_{R2}$ is connected to the operational amplifier 242. The operational amplifiers 241 and 242, the transistor 250, and the resistor 245 form a differential circuit to generate a current $I_{250}$ at the transistor 250.

$$I_{250} = \frac{(k \times V_{FB}) - V_{R2}}{R_{245}}$$

where the $R_{245}$ represents the resistance of the resistor 245, and k represents the ratio of the divider composed by the resistive devices 225 and 226.

The value of the reference signal $V_{R2}$ is correlated to the value of the clamp signal $V_{R1}$ and the ratio of divider composed by the resistive devices 225 and 226. The current $I_{250}$ is coupled to generate the differential signal $S_I$ through the current mirror transistors 251 and 253.

$$S_I = k_2 \times \frac{(k \times V_{FB}) - (k_1 \times V_{R1})}{R_{245}}$$

where the $k_2$ represents the gain (ratio) of the current mirror transistors 251 and 253, and $k_1$ represents the value of ($V_{R2}/V_{R1}$).

Therefore, the programming signal and the clamp signal $V_{R1}$ produce the differential signal $S_I$ that is further coupled to generate the threshold signal $I_{PK}$. The current mirror transistors 251 and 252 generate a current $I_{252}$ coupled to be compared with the current of current source 260 for generating the open-loop signal $S_N$ via the buffer 261. The buffer 261 will output the open-loop signal $S_N$ once the current $I_{252}$ is higher than the current of the current source 260. It means the open-loop signal $S_N$ is enabled when the value of the terminal signal (that is the first range) is higher than the clamp signal $V_{R1}$.

Figure 4:
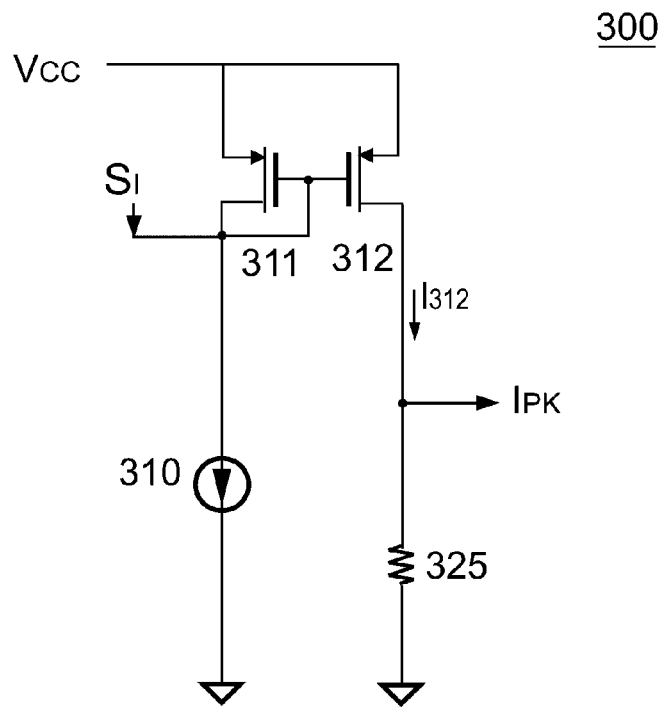
FIG. 4 shows an exemplary embodiment of the peak-current-threshold circuit in FIG. 2.

FIG. 4 shows an exemplary embodiment of the peak-current-threshold circuit 300 according to the present invention. The peak-current-threshold circuit 300 is used for generating the threshold signal $I_{PK}$ in accordance with the differential signal $S_I$. The differential signal $S_I$ is coupled to a current source 310 for generating a differential current which is coupled to current mirror transistors 311 and 312. The current mirror transistor 312 generates a current $I_{312}$. The current $I_{312}$ induces the threshold signal $I_{PK}$ at a resistor 325. The maximum value of the threshold signal $I_{PK}$ is determined by the current of the current source 310. The threshold signal $I_{PK}$ is reduced in response to the increase of the differential signal $S_I$.

Figure 5:
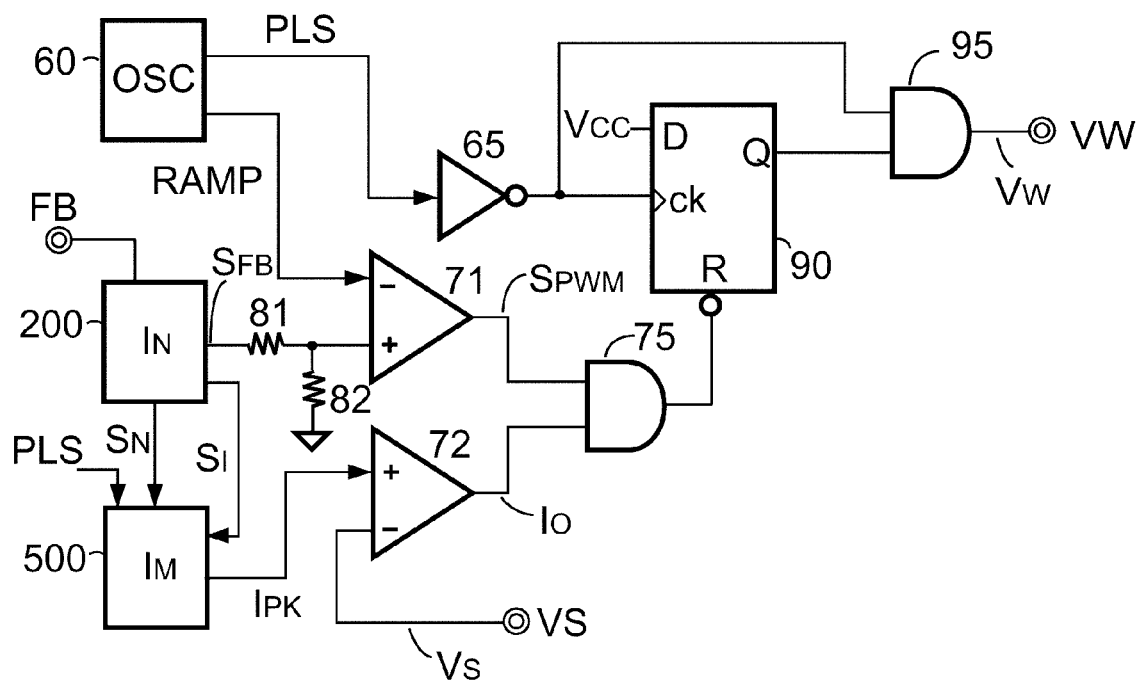
FIG. 5 shows another exemplary embodiment of the controller.

FIG. 5 shows another exemplary embodiment of the controller 100' according to the present invention. Most circuits in the embodiment are the same as the last embodiment shown in FIG. 2 so the description is omitted here. The main difference as the last embodiment is that the controller 100' comprises a peak-current-threshold circuit ($I_M$) 400 for receiving the differential signal $S_I$ and the open-loop circuit $S_N$ and generating the threshold signal $I_{PK}$ according to the differential signal $S_I$, the open-loop signal $S_N$, and a pulse signal PLS.

Figure 6:
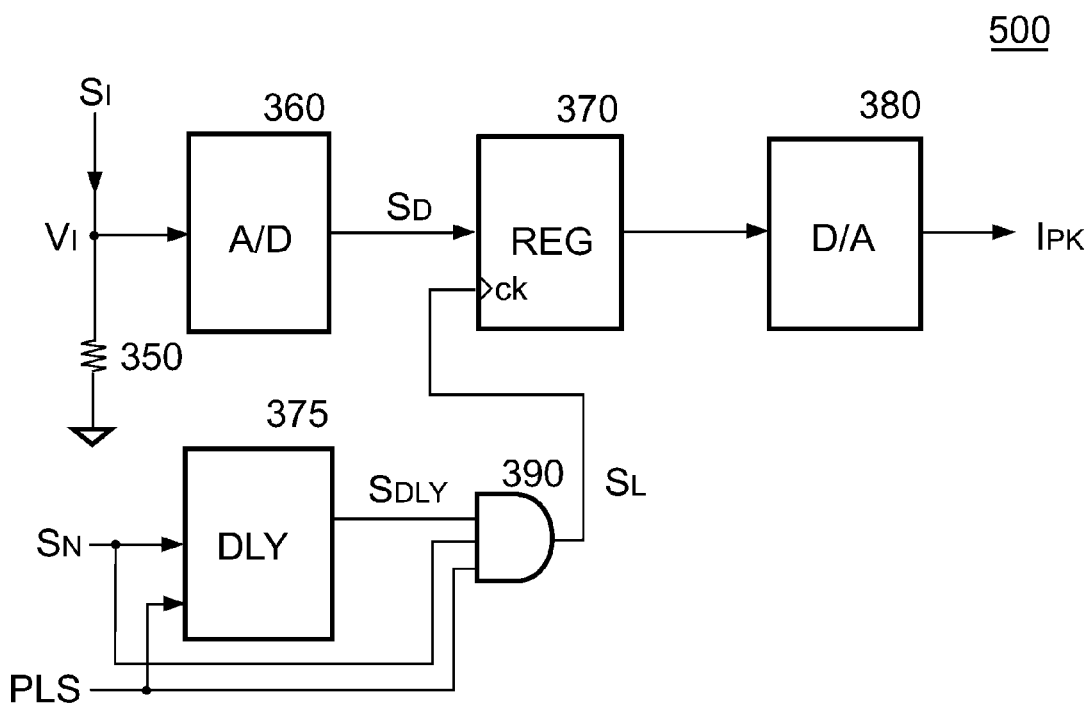
FIG. 6 shows an exemplary embodiment of the peak-current-threshold circuit shown in FIG. 5.

FIG. 6 shows an exemplary embodiment of the peak-current-threshold circuit 400 according to the present invention. The threshold signal $I_{PK}$ is generated in accordance with the differential signal $S_I$ and the open-loop signal $S_N$. The differential signal $S_I$ produces a differential voltage $V_I$ at a resistor 350. An analog-to-digital converter (A/D) 360 generates a digital signal $S_D$ coupled to a register (REG) 370. The open-loop signal $S_N$ is connected to a delay circuit (DLY) 375 and an AND gate 390. The delay circuit 375 generates a delay signal $S_{DLY}$ in response to the enable of the open-loop signal $S_N$. The delay signal $S_{DLY}$ and the pulse signal PLS are connected to the input of the AND gate 390. The output of the AND gate 390 will generate a latch signal $S_L$ when the open-loop signal $S_N$ is enabled over a delay time. The delay time is defined by the delay circuit 375. The latch signal $S_L$ is connected to clock the register 370 for sampling and holding the digital signal $S_D$ into the register 370. The output of the register 370 is connected to a digital-to-analog converter (D/A) 380. The output of the digital-to-analog converter 380 generates the threshold signal $I_{PK}$. Thus, the latch signal $S_L$ is used for a sampling and holding operation performed by the register 370 of the peak-current-threshold circuit 400 to generate the threshold signal $I_{PK}$. In other words, the threshold signal $I_{PK}$ is thus generated according to the sampling and holding operation.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A switching regulator of a power converter comprising:
   a feedback-input circuit coupled to a terminal of the switching regulator for receiving a feedback signal, wherein the feedback-input circuit is operated in a first range of a terminal signal;
   an external resistor coupled to the node;
   a programming circuit coupled to the terminal for generating a programming signal, wherein the programming signal is operated in a second range of the feedback signal, and the external resistor determines the programming signal; and
   a peak-current-threshold circuit generating a threshold signal in accordance with the programming signal;
   wherein the programming circuit comprises a current source coupled to the terminal, and the current source associates with the external resistor to produce the programming signal for determining the threshold signal,
   wherein the feedback signal is coupled to regulate the output of the power converter, and the threshold signal is coupled to limit a peak switching current of the power converter.

2. The switching regulator as claimed in claim 1, in which a maximum value of the first range of the terminal signal is limited by a clamp signal.

3. The switching regulator as claimed in claim 2, in which the programming signal and the clamp signal produce a differential signal, and the differential signal is further coupled to generate the threshold signal.

4. The switching regulator as claimed in claim 2, in which the maximum value of the feedback signal is limited by the clamp signal.

5. The switching regulator as claimed in claim 2, in which the programming circuit further generates an open-loop signal when the value of the terminal signal is higher than the clamp signal.

6. The switching regulator as claimed in claim 5, in which the programming circuit further comprises a delay circuit to generate a latch signal after the open-loop signal is generated, and the latch signal is coupled to sample and hold the threshold signal.

7. The switching regulator as claimed in claim 1, in which the first range of the terminal signal and the second range of the programming signal are voltage signals, the first range of the terminal signal is lower than the second range of the programming signal.

8. The switching regulator as claimed in claim 1, in which the peak-current-threshold circuit performs a sampling and holding operation to generate the threshold signal.

* * * * *